United States Patent
Swann et al.

(10) Patent No.: US 8,892,897 B2
(45) Date of Patent: Nov. 18, 2014

(54) METHOD FOR GENERATING AND DETECTING AUDITABLE PASSWORDS

(75) Inventors: Matthew Michael Swann, Bothell, WA (US); David Charles LeBlanc, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 13/216,561

(22) Filed: Aug. 24, 2011

(65) Prior Publication Data
US 2013/0055380 A1    Feb. 28, 2013

(51) Int. Cl.
G06F 21/00 (2013.01)
G06F 21/62 (2013.01)
G06F 21/46 (2013.01)

(52) U.S. Cl.
CPC ............ *G06F 21/46* (2013.01); *G06F 21/6245* (2013.01)
USPC .............................. 713/183; 726/18; 713/182

(58) Field of Classification Search
CPC ............................. G06F 21/46; G06F 21/6245
USPC ...................................... 713/182–185; 726/18
See application file for complete search history.

(56) References Cited

U.S. PATENT DOCUMENTS

| | | | |
|---|---|---|---|
| 6,079,021 A * | 6/2000 | Abadi et al. | 726/14 |
| 7,650,509 B1 * | 1/2010 | Dunning | 713/184 |
| 7,694,147 B2 | 4/2010 | Lott | |
| 7,809,130 B1 | 10/2010 | Kalyadin | |
| 2006/0136738 A1 * | 6/2006 | Bauchot et al. | 713/183 |
| 2007/0079143 A1 | 4/2007 | Fazal | |
| 2008/0052525 A1 | 2/2008 | Botchek | |
| 2009/0019540 A1 | 1/2009 | Itsik | |
| 2009/0126018 A1 * | 5/2009 | Keohane et al. | 726/23 |
| 2009/0150991 A1 | 6/2009 | Hoey | |

OTHER PUBLICATIONS

"Password Auditing Applications," Cisneros et al. 2006.*
Dandass, Yoginder S.; Using FPGAs to Parallelize Dictionary Attacks for Password Cracking; Jan. 7-10, 2008, 8 pages.
Dell'Amico et al.; Password Strength: An Empirical Analysis; Mar. 14-19, 2010; 9 pages.
O'Connor, Luke; The Password Paradox ; Jun. 23, 2003, 52 pages.

* cited by examiner

*Primary Examiner* — Philip Chea
*Assistant Examiner* — Kendall Dolly
(74) *Attorney, Agent, or Firm* — Tom Wong; Jim Ross; Micky Minhas

(57) ABSTRACT

A method for creating a password on an electronic computing device is disclosed. On the electronic computing device, a first password is obtained. The first password comprises a string of one or more characters. A first character is appended to the first password to form a second password. A hash function is applied to the second password to generate a first hashed password. The first hashed password comprises a first bit string. A determination is made as to whether the first hashed password includes a predefined sequence of bits. When it is determined that the first hashed password includes the predefined sequence of bits, the second password is designated as an auditable password.

20 Claims, 6 Drawing Sheets

Examples of Strong Passwords

302 — SR-*E5>S%Y

304 — ?h_AI3{h-e

306 — Kxn-KS<u20

308 — W#oP^w_^]5

310 — q3:ciJaI^l

Example of Regular Hashed Password: 402 ⟍ 0x4D 0x69 0xFE 0x09 ...

Example 1 of Auditable Hashed Password: 404 ⟍ 0x00 0x01 0x02 0xDE ...

Example 2 of Auditable Hashed Password: 406 ⟍ 0x00 0xMM 0xYY 0x11 ...

FIG. 4

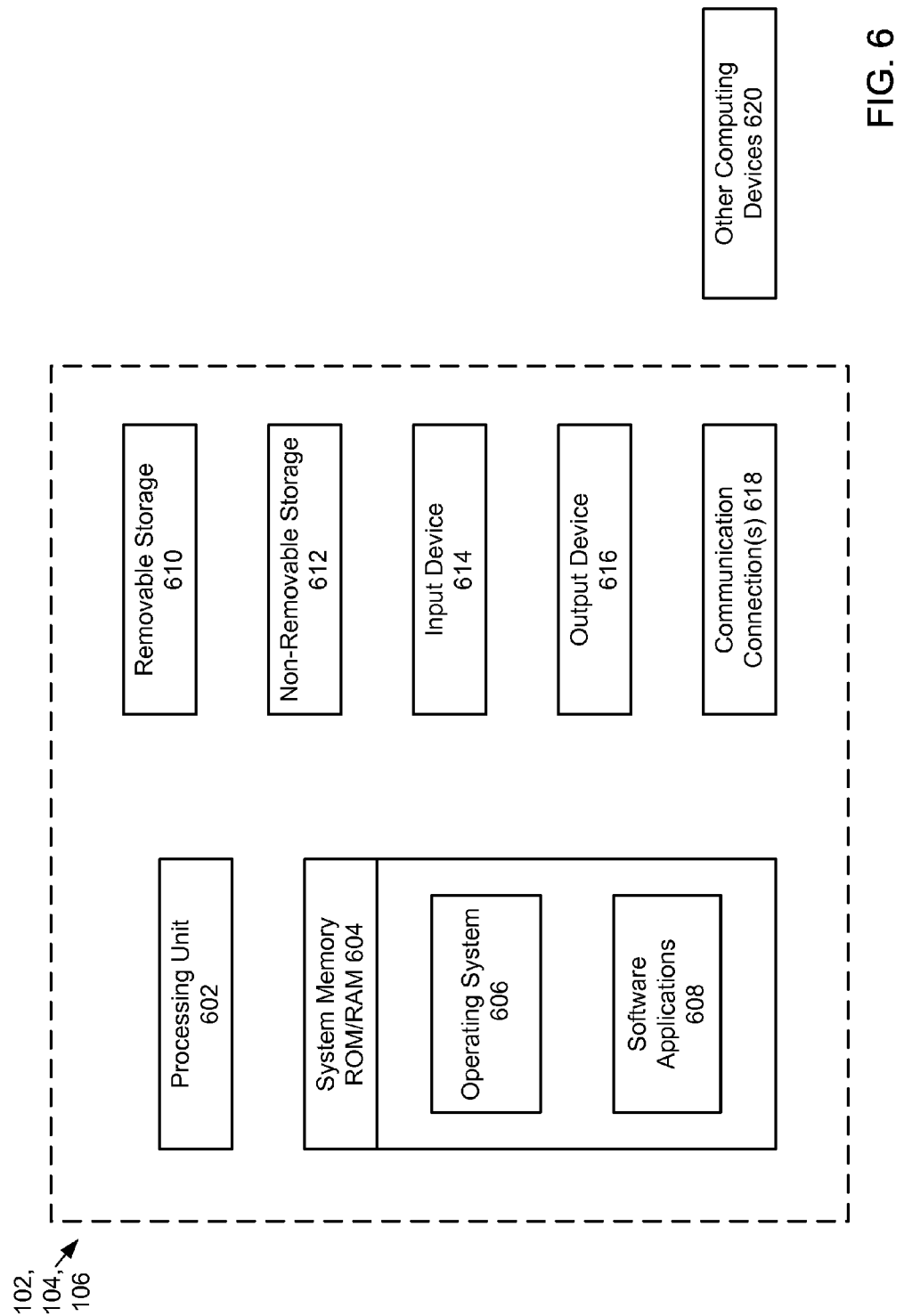

METHOD FOR GENERATING AND DETECTING AUDITABLE PASSWORDS

BACKGROUND

User passwords are an important part of a system of computer security. When passwords are compromised, computer security becomes at risk. One way in which passwords may be compromised is when passwords are included in data that may be viewed by others.

Because the possible inclusion of user passwords in data is a known security risk, business organizations may monitor documents, log files, and other data to detect the inclusion of user passwords. However, it is typically difficult to detect user passwords in documents and other data unless the user passwords are known beforehand. Providing user passwords for inclusion in an automated password detection system creates a security risk in and of itself.

SUMMARY

Embodiments of the disclosure are directed to a method implemented on an electronic computing device for creating a password. On the electronic computing device, a first password is obtained. The first password comprises a string of one or more characters. A first character is appended to the first password to form a second password. A hash function is applied to the second password to generate a first hashed password. The first hashed password comprises a first bit string. A determination is made as to whether the first hashed password includes a predefined sequence of bits. When it is determined that the first hashed password includes the predefined sequence of bits, the second password is designated as an auditable password.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

FIG. 3 shows examples of strong passwords.

FIG. 4 shows examples of hashed passwords.

FIG. 6 shows example components of the client and server computers of FIG. 1.

DETAILED DESCRIPTION

Figure 1:
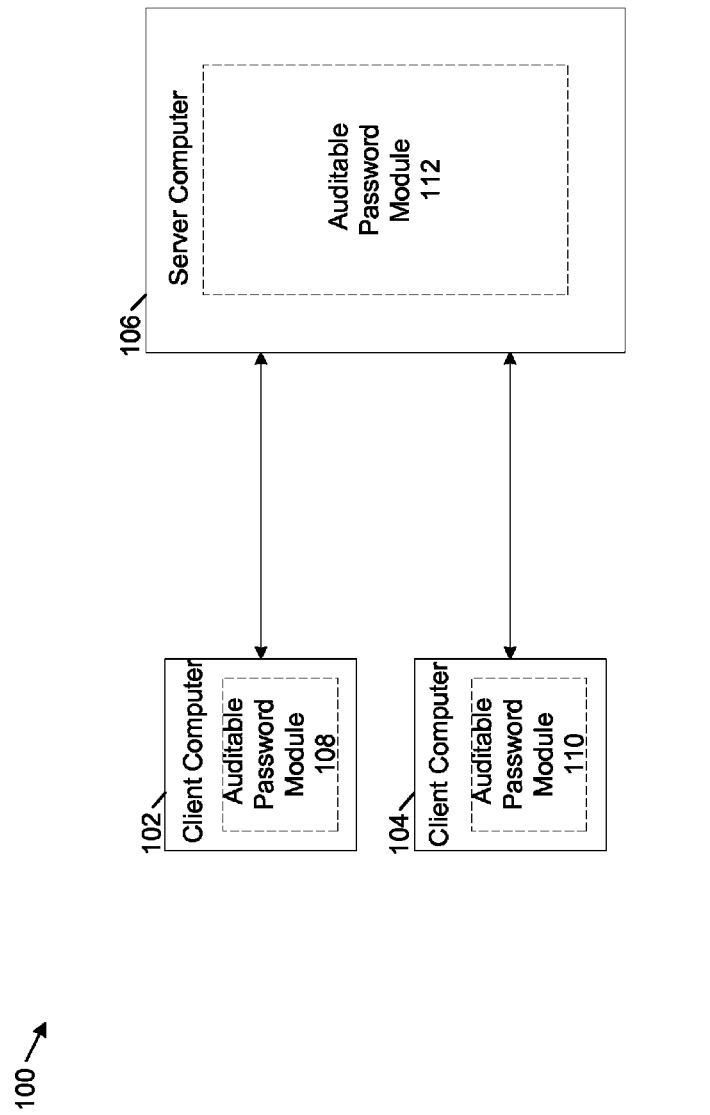
FIG. 1 shows an example system that supports that supports the generation and detection of auditable passwords.

The present application is directed to systems and methods for generating auditable passwords that may be automatically detected by password detection software. The auditable passwords are generated by appending one or more characters to a base password, applying a hash function to the character appended base password and determining whether the hash function produces a bit string that includes a predefined sequence of bits. When the hash function produces a bit string that includes the predefined sequence of bits, the character appended base password becomes an auditable password that can be provided to a user or that can be used by autonomous computer services that make use of passwords.

When the bit string produced by the hash function does not include the predefined sequence of bytes, one or more characters are appended to the user password and the hash function is run again. The process of appending one or more characters to the user password and applying the hash function to the character appended user password is repeated until the bit string generated by the hash function includes the predefined sequence of bits. When the bit string generated by the hash function includes the predefined sequence of bits, the character appended user password becomes the auditable password.

The predefined sequence of bits may comprise any number of bits. Typically, the predefined sequence of bits comprises a predefined sequence of bytes, typically 8 bits to a byte. In the remainder of this disclosure, the systems and methods are described in terms of a predefined sequence of bytes.

When an auditable password is provided to a user, the auditable password may be used as a normal user password, for logins, etc. A user typically understands that a password is confidential and should not be disclosed to others. However, sometimes passwords are inadvertently or intentionally introduced into data, such as documents or email messages, that can be accessed by others.

When the auditable password is included in data such as a document, file, network packet or computer memory, the auditable password may be identified by password detection software. The password detection software applies the hash function to each character string in the document, file, network packet or computer memory. When the hash function is applied to the auditable password, the hash function generates a bit string that includes the predefined sequence of bytes. The detection of the predefined sequence of bytes provides an indication to the password detection software that the document, file, network packet or computer memory includes a password. Because the inclusion of a password in a document, file, network packet or computer memory may be considered to be a security breach, appropriate action may then be taken. One example of a network packet is an email message. Other examples of data where auditable passwords may be used and detected are possible.

The predefined sequence of bytes is a sequence of bytes that includes a pattern that can be readily identified, for example a specific number pattern or a string that includes an embedded date. Typically, the predefined sequence of bytes occurs at the beginning of the bit string. However, in examples, the predefined sequence of bytes may be located at any position in the bit string.

FIG. 1 shows an example system 100 that supports the generation and detection of auditable passwords. The example system 100 includes client computers 102, 104 and a server computer 106. Client computers 102, 104 are connected to server computer 106 across a network, typically a corporate Intranet or the Internet. More or fewer client computers, server computers or other computing devices may be used.

Client computer 102 includes an auditable password module 108, client computer 104 includes an auditable password module 110 and server computer 106 includes an auditable password module 112. In examples auditable password modules 108, 110 and 112 may be an identical module, providing the same functionality. In other examples, auditable password modules 108, 110 and 112 may not be the same. In examples, one or more of client computer 102, 104 and server computer 106 may not include an auditable password module.

In examples server computer 106 may obtain an auditable password from auditable password module 112 and send the auditable password to a user on client computer 102 or client computer 104. In other examples, a user on client computer 102 may obtain an auditable password from auditable password module 108 and a user on client computer 104 may obtain an auditable password from auditable password module 110. In still other examples, a user on client computer 102 may input a user created password to auditable password module 108 and the auditable password module 108 may create an auditable password from the user created password. Similarly, a user on client computer 104 may provide a user created password to auditable password module 110 and the auditable password module 110 may create an auditable password from the user created password on client computer 104.

Figure 2:
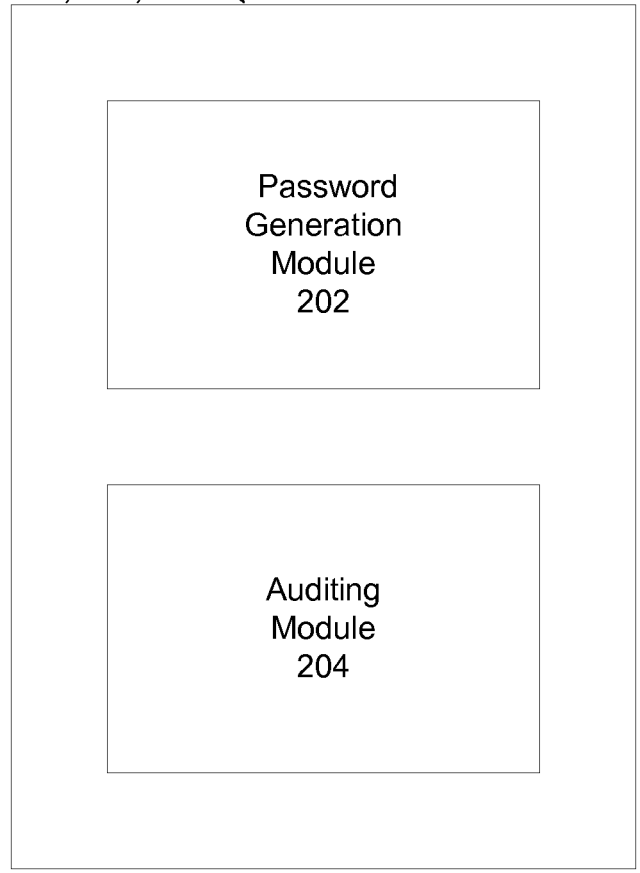
FIG. 2 shows example components of the auditable password module of FIG. 1.

FIG. 2 shows example modules 200 of auditable password modules 108, 110, 112. The example modules 200 include a password generation module 202 and an auditing module 204. The example password generation module 202 includes software that generates an auditable password. The auditing module 204 includes software that can detect the auditable password when the auditable password is included in data such as a document, file, network packet or computer memory. In some embodiments the auditable password modules 108, 110, 112 may not include the auditing module 204. In those embodiments, the auditing module 204 may be located on a different electronic computing device than client computers 102, 104 and server computer 106. For example, the auditing module 204 may be located on a server computer at a location accessible to a plurality of other server computers. In other embodiments, the auditable password modules 108 and 110 may not include the password generation module 202 and the auditable password module 112 may not include the auditing module 204. In these other embodiments the client computers, for example client computers 102 and 104, include auditing software but may not include password generation software and a server computer, for example server computer 106 includes password generation software but may not include auditing software. Additional embodiments are possible.

As explained in more detail later herein, an auditable password includes a predefined sequence of bytes that is detectable by the auditing module 204. The auditable password comprises a bit string that includes the predefined sequence of bytes. For example, the predefined sequence of bytes may be three sequential bytes such as 0x00, 0x01 and 0x02. Any combination of bytes may be used, and any number of bytes may be used. In examples, the predetermined sequence of bytes may include an embedded date. For example, one sequence of three bytes may be 0x00, 0xMM, 0xYY, where MM is a hexadecimal byte representing the current month and YY is a hexadecimal byte representing the current year. MM may be a number between 0x00 and 0x12 and YY may be a number between 0x00 and 0x99.

The example auditing module 204 includes password detection software that is able to detect auditable passwords in data such as documents, files, network packets or computer memory. The password detection software applies a hash function to character strings included in the documents, files, network packets and computer memory and determines whether a bit string generated by the application of the hash function to a character string includes the predefined sequence of bytes. When the bit string that includes the predefined sequence of bytes is detected, a determination is made that a password has been detected. Because the password detection software is able to detect auditable passwords by detecting the predefined sequence of bytes and without needing to know the actual user password, computer system security is enhanced.

The password detection software may include one or more optimizations that improve the efficiency of detecting auditable passwords. For example, if the auditable password is restricted to a specific set of characters, the password detection software only needs to run the hash function on character strings that include the specific set of characters. Thus, if the auditable password is restricted to lower case alphabetic characters only, the password detection software only needs to run the hash function on character strings that only include lower case alphabetic characters. Similarly, if the auditable password is required to have a minimum number of characters, the password detection software only needs to run the hash function on characters strings that have the minimum number of characters. Other optimizations for the password detection software are possible.

The data for which the password detection software is used may also include log files. In examples, log files are generated by computer systems, for example server computer 106, to provide a history of activity on the computer systems. For example log files may be generated for events such as logins or logouts on server computer 106. Log files may be generated for emails sent or received by server computer 106 and log files may be generated each time a document is accessed on server computer 106. Other examples of log files are possible. In examples, the password detection software in the auditing module 204 may monitor one or more log files generated on server computer 106 to determine whether the one or more log files contain a password. Log files on other electronic devices, for example log files on client computers 102, 104 may also be monitored. The detection of a password in a log file may constitute an unauthorized use of a password.

In addition to using an auditable password for login purposes, auditable passwords may also be used as a secret password that may be imbedded in documents or photos to determine whether security is being breached. For example, an auditable password may be imbedded in an image or a document obtained from an Internet site. If the image or document obtained from the Internet site is sent to or stored on a computer system that includes an auditable password module, the password detection software may be able to detect the secret password as a way of tracing the image or the document obtained from the Internet site. Other examples of the use of secret auditable passwords are possible. In this disclosure, the term "password" includes the use of a character string embedded in a document for use as secret password. A secret password may comprise any data that may be desired to be kept secret, for example user names or server names that may be desired to be kept secret.

When generating an auditable password, the example password generation module 202 starts with a base password. The base password may be any user supplied password or the base password may be a computer generated password. Base passwords typically have a length restriction that may vary on different computer systems.

Computer generated passwords may be strong passwords. Strong passwords are passwords that may include at least one of each of an alphabetic character, a numeric character and a non-alphanumeric printable character. Some strong passwords may require both a lower case alphabetic character and an upper case alphabetic character. Other characteristics of strong passwords are possible, for example password length may be a factor in designating a password as a strong password. FIG. 3 provides examples of strong passwords.

Once a base password is created, the password generation module 202 typically appends one character to the end of the base password to form a modified base password. In some embodiments, the password generation module 202 may append more than one character to the end of the base password to form the modified password. In other embodiments, one or more characters may be appended to a position in the base password other than the end of the base password.

The characters that are appended to the base password are typically obtained from a character set that includes lower case alphabetic characters, upper case alphabetic characters, numeric characters and non-alphanumeric printable characters. Examples of non-alphanumeric printable characters are an exclamation point, a dollar sign, a semi-colon, etc. Typically characters are appended in a sequential order. For example, a first character to be appended may be a lower case "a", the second character to be appended may be a lower case "b", the third character to be appended may by a lower case "c", etc. When all lower case characters are used, the next character to be appended may be an upper case "A". Similarly, when all upper case characters are used, numeric and non-alphanumeric printable characters may be used in sequence. Alternate character sequences are possible. Typically, the character set comprises the ASCII character set, although different character sets may be used.

After the modified base password is formed, a hash function is applied to the modified base password. The hash function is typically a cryptographic hash function, although other hash functions may be used. A cryptographic hash function takes an arbitrary block of data, in this case the modified base password, and returns a bit string. The bit string, the result of the hash function is typically represented by a series of hexadecimal bytes. The hash function is designed such that whenever the hash function is applied to the same block of data, the same bit string is produced. Thus, whenever the hash function produces a desired result for a specific modified base password, each time the hash function is applied to the modified base password, the same desired result (i.e. a specific bit string) will be produced. An example of a cryptographic hash function is the SHA-1 cryptographic hash function designed by the National Security Agency.

When the hash function is applied to the modified base password, the password generation module 202 evaluates the bit string that is generated by the hash function. When the bit string produced by the hash function includes the predefined sequence of bytes, the modified base password is designated as an auditable password. Each time the hash function is applied to the auditable password, a bit string is generated that includes the predefined sequence of bytes. As discussed, the predefined sequence of bytes is a specific byte sequence, such as 0x01 0x02 0x03.

When the bit string generated by the hash function does not include the predefined sequence of bytes, a different character is appended to the base password to form a new modified base password and the hash function is applied to the new modified base password. For example, if a lower case "a" is initially appended to the base password to form the initial modified base password, a lower case "b" may be applied to the base password to form the new modified base password.

When the hash function is applied to the new modified base password, a new bit string is generated by the hash function. The password generation module 202 evaluates the new bit string that is generated by the hash function to determine whether the new bit string includes the predefined sequence of bytes. When a determination is made that the new bit string does not include the predefined sequence of bytes, another different character is appended to the end of the base password and the hash function is applied again. The process of appending one character from a character set to the end of the base password to form a modified base password, applying the hash function to the modified base password, and evaluating the bit string that is generated by the hash function continues until the bit string that is generated by the hash function includes the predefined sequence of bytes or until each of the characters in the character set have been tried as the one character that is appended to the end of the base password.

When all the characters in the character set have been tried and the bit string that is generated by the hash function still does not include the predefined character string, two or more characters are appended to the end of the base password and the hash function is applied to the base password that is appended with the two or more characters. In some embodiments, the two or more passwords are appended to the end of the base password when only a subset of the characters in the character set has been tried. After application of the hash function, a determination is made as to whether a bit string generated by the hash function includes the predetermined character string. Typically, various combinations of two characters are appended to the base function and the hash function is run after each combination. If the bit string result of the hash function run after each combination still does not include the predefined sequence of bytes, various combinations of three or more characters are appended to the end of the base password. In some embodiments, if an auditable password is not generated within a predefined time, a different base password is selected and the process of generating an auditable password starts over.

An alternative method of generating an auditable password is to append or prepend a character key to the base password and apply the hash function to the base password that is appended or prepended with the character key. The character key is a character string that is used when detecting the auditable password, as explain later herein. In this disclosure, the character key is designated as a "salt". The term "salt" for this purpose is known by those skilled in the art. After the base password in appended or prepended by the salt, the process of generating the auditable password is the same as previously described herein. That is, the hash function is applied to the base password that is appended or prepended by the salt and a determination is made as to whether the bit string result of the hash function includes the predetermined sequence of bytes. If the bit string result of the hash function does not include the predetermined sequence of bytes, one or more characters are appended to the base password that is appended or prepended by the salt and a determination is made as to whether the bit string result of the hash function includes the predetermined sequence of bytes. However, when a determination is made that the bit string result of the hash function includes the predetermined sequence of bytes, the character string that is designated as the auditable password is the base password alone and does not include the salt.

When the password detection software is run against character strings in data such as documents, files, network packets or computer memory, the password detection software prepends or appends the salt to each character string and applies the hash function to the prepended or appended character string. If any character string in the documents, files, network packets or computer memory is a password, when the hash function is applied to the character string that is appended or prepended with the salt, the bit string result of the hash function includes the predetermined sequence of bytes.

One reason for appending or prepending the base password with the salt is to minimize the likelihood that attackers may discover the auditable password in a document, file, network packet or computer memory. For example, if an attacker discovers the predetermined sequence of bytes, the hacker may apply a standard hash function, for example the SHA-1 hash function to each character string in the document, file, network packet or computer memory. If a bit string result of the hash function includes the predefined sequence of bytes, the attacker may determine that the character string is an auditable password. However, because the salt needs to be appended or prepended to the character string in order for the hash function result to include the predetermined sequence of bytes and because salt is typically a secret key that is not known to the attacker, if an auditable password is included as a character string in a document, file, network packet or computer memory, when the attacker applies the hash function to the character string the result of the hash function will not include the predetermined sequence of bytes. The reason is that the salt needs to be appended or prepended to the character string that is the auditable password in order for the result of the hash function to include the predetermined sequence of bytes. Thus, appending or appending a salt to a base password may provide an additional degree of security.

Depending on the size and characteristics of the base password, the process of generating a hash function result that includes the predefined sequence of bytes may be time consuming. Because the process of generating an auditable password is time consuming, auditable passwords may be pre-generated and stored in memory on the computer system in which the auditable password is generated, for example in memory on client computer 102, client computer 104 or server computer 106. Auditable passwords may also be stored on other server computers in a network. When auditable passwords are stored on a server computer, for example on server computer 106, a pool of auditable passwords may be made available to users via web services.

FIG. 4 shows examples 400 of hashed passwords. Bit string 402 is an example of a result of applying a hash function to a character appended base password. The example bit string 402 is represented as a series of hexadecimal bytes. As shown in FIG. 4, the hexadecimal bytes in the bit string 402 do not include the predefined sequence of bytes 0x00 0x01 0x02. The example bit string 404 is an example result of applying the hash function to the character appended base password in which the bit string result of applying the hash function includes the predefined sequence of bytes 0x00 0x01 0x02. The character appended base password that when hashed generated bit string 404 may be used as an auditable password. The example bit string 406 is an example of applying the hash function to a character appended base password in which the bit string result includes an embedded date. For example, the first byte in bit string 406 is 0x00, the second byte in bit string 406 is a byte that corresponds to a month (i.e. having a value between 1 and 12) and the third byte in bit string 406 is a byte that corresponds to a year (i.e. having a value between 0 and 99).

Figure 5:
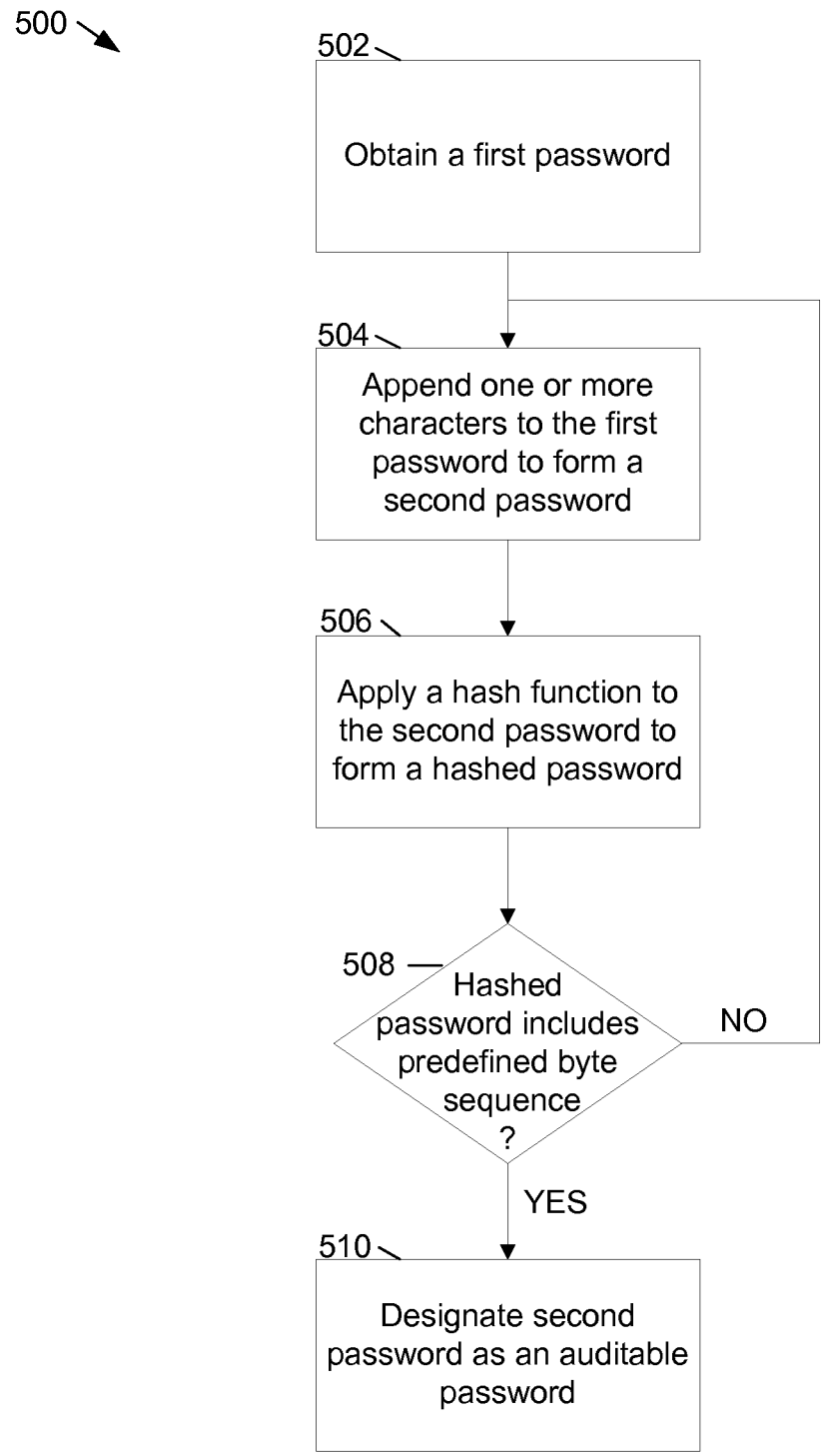
FIG. 5 shows a flowchart of a method for generating an auditable password.

FIG. 5 shows an example flowchart of a method 500 for generating an auditable password. At operation 502 a first password is obtained by a user at an electronic computer device, for example client computer 102 or client computer 104. The first password may be a password created or chosen by the user or the first password may be supplied by the electronic computer device, for example by the auditable password module 108 on client computer 102. When the first password is supplied by the electronic computing device, the first password is typically a strong password.

The first password is typically a password used for computer login purposes. However, in some embodiments the first password may be a generic password used for computer security purposes. For example, the first password may be embedded in one or more documents so that it may be determined whether the one or more documents are used in an insecure manner. An example of a document being used in an insecure manner is when a confidential or secret document is distributed to unauthorized individuals.

At operation 504, one or more characters are appended to the end of the first password to form a second password. The one or more characters are obtained from a set of characters that may include a lower case alphabetic character, an upper case alphabetic character, a numeric character and a non-alphanumeric printable character. Typically, one character is appended to the end of the first password at operation 504, for example a lower case "a".

At operation 506, a hash function is applied to the second password to form a hashed password. The hash function is typically a cryptographic hash function, although other hash functions may be used. The hashed password is a bit string that includes one or more hexadecimal characters.

At operation 508, a determination is made as to whether the hashed password includes a predefined sequence of bytes. One example of a predefined sequence of bytes is 0x00 0x01 0x02. An example of a predefined sequence of bytes that includes an imbedded date is 0x00 0xMM 0xYY, where MM is a hexadecimal byte that represents the current month and YY is a hexadecimal byte that represents the current year. Other examples of predefined sequences of byes are possible. In examples the hashed password begins with the predefined sequence of bytes. In other examples, the predefined sequence of bytes may be located in a different position in the hashed password.

When it is determined at operation 508 that the hashed password generates a bit string that includes the predefined sequence of bytes, the second password is designated as an auditable password and made available to a user. During use, when a document includes the auditable password and the hash function is applied to the auditable password, the hash function generates a bit string that includes the predefined sequence of bytes.

When it is determined at operation 508 that the hashed password does not include the predefined sequence of bytes, control returns to operation 504 and one or more characters are appended to the first password to form the second password. Typically one character is applied to the end of the first password to form the second password and the one character that is applied is different than the one character previously applied. For example, if the first time operation 504 is executed a lower case "a" is appended to the end of the first password, the second time operation 504 is executed a lower case "b" may be applied to the end of the first password. Typically, each time operation 504 is executed the next sequential character in the one or more character set is appended to the end of the first password. However, in examples, another character in the character set may be appended to the end of the first password.

After operation 504 is executed a second time, at operation 506 the hash function is applied to the second password again to form a hashed password. However, because the second password is now different than the first time operation 504 is executed, the hashed password is also different from the first time operation 504 is executed.

At operation 508, a determination is made as to whether the hashed password from the second execution of operation 506 includes the predefined sequence of bytes. When it is determined that the hashed password from the second execution of operation 506 does not include the predefined sequence of bytes, control passes again to operation 504 and a different character, for example a lower case "c" is appended to the end of the first password.

Operations 504-506 continue to execute in sequence until the hashed password that is generated in operation 506 includes the predefined sequence of bytes. When all the characters in the character set have been appended (one at a time) to the end of the base password and the hashed password still does not include the predefined sequence of bytes, an additional character is appended to the end of the base password. For example, a lower case "a" may be appended to the end of the base password followed by a second lower case "a". In another iteration of operations 504-506, the lower case "a" may be appended to the end of the base password followed by a lower case "b", etc.

The process of executing operations 504-506 in sequence until the hashed password generated in operation 506 includes the predefined sequence of bytes may take multiple seconds to complete. Typically the process takes around 30 seconds, but the process may take less or more time to complete. When a determination is made at operation 508 that the hashed password includes the predefined sequence of bytes, at operation 510, the second password is designated as an auditable password. The second password that is designated as the auditable password is the character appended first password that when hashed at operation 506 produces a hashed password that includes the predefined sequence of bytes.

With reference to FIG. 6, example components of client computers 102, client computer 104 and server computer 106 are shown. In example embodiments, client computer 102, client computer 104 and server computer 106 are computing devices. Client computer 102, client computer 104 and server computer 106 can include input/output devices, a central processing unit ("CPU"), a data storage device, and a network device. Client computer 102 and client computer 104 can also be a mobile computing device, such as a laptop, tablet, convertible, or other handheld device like a smartphone or cellular telephone. Server computer 106 can also be incorporated as one or more server computers in a network of servers. In such a scenario, the network can provide a cloud computing platform in which one or more applications and data are hosted for clients connecting to the cloud computing platform. The discussion below regarding server computer 106 also applies to the components of client computer 102 and to client computer 104.

In a basic configuration, server computer 106 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of a server, such as the Microsoft SharePoint® Server 2010 collaboration server, from Microsoft Corporation of Redmond, Wash. The system memory 604 may also include one or more software applications 608 and may include program data.

The server computer 106 may have additional features or functionality. For example, server computer 106 may also include computer readable media. Computer readable media can include both computer readable storage media and communication media.

Computer readable storage media is physical media, such as data storage devices (removable and/or non-removable) including magnetic disks, optical disks, or tape. Such additional storage is illustrated in FIG. 6 by removable storage 610 and non-removable storage 612. Computer readable storage media may include volatile and nonvolatile, removable and non-removable media implemented in any method or technology for storage of information, such as computer readable instructions, data structures, program modules, or other data. Computer readable storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by server computer 106. Any such computer readable storage media may be part of server computer 106. Server computer 106 may also have input device(s) 614 such as keyboard, mouse, pen, voice input device, touch input device, etc. Output device(s) 616 such as a display, speakers, printer, etc. may also be included.

Consistent with embodiments of the present disclosure, the input device(s) 614 may comprise any motion detection device capable of detecting the movement or gesture of a user. For example, the input device(s) 614 may comprise a Kinect® motion capture device, from Microsoft Corporation, comprising a plurality of cameras and a plurality of microphones.

The server computer 106 may also contain communication connections 618 that allow the device to communicate with other computing devices 620, such as over a network in a distributed computing environment, for example, an intranet or the Internet. Communication connections 618 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Embodiments of the present disclosure may be practiced via a system-on-a-chip (SOC) where each or many of the components illustrated in FIG. 6 may be integrated onto a single integrated circuit. Such an SOC device may include one or more processing units, graphics units, communication units, system virtualization units and various application functionality all of which are integrated (or "burned") onto the chip substrate as a single integrated circuit. When operating via an SOC, the functionality, described above, with respect to the present disclosure may be operated via application-specific logic integrated with other components of the computing devices 102, 104 and 106 on the single integrated circuit (chip).

The various embodiments described above are provided by way of illustration only and should not be construed to limiting. Various modifications and changes that may be made to the embodiments described above without departing from the true spirit and scope of the disclosure.

What is claimed is:
1. A method comprising:
on an electronic computing device, obtaining a first password, the first password comprising a string of one or more characters;
appending a first character from a set of characters to the first password to form a modified first password;

applying a hash function to the modified first password to generate a first hashed password, the first hashed password comprising a first bit string;

determining whether a portion of the first hashed password includes a predefined sequence of bits;

when the first hashed password includes the predefined sequence of bits, designating the modified first password as an auditable password; and when the first hashed password does not include the predefined sequence of bits then performing steps of:
  a) appending a different character from the set of characters to the end of the first password to form a modified first password, the different character not previously appended to the end of the first password;
  b) applying the hash function to the modified first password;
  c) evaluating a bit string result of applying the hash function from step b;
  d) when the bit string result from step c does not include the predefined sequence of bits, repeating steps a-c until the bit string result from step c includes the predefined sequence of bits or until each character in the set of characters has been appended to the end of the first password per step a; and
  e) when the bit string from step c includes the predefined sequence of bits, designating the modified first password as an auditable password.

2. The method of claim 1, further comprising:
when the first hashed password does not include the predefined sequence of bits:
  appending a second character to an end of the first password to form a third password, the second character being different than the first character;
  applying the hash function to the third password to form a second hashed password;
  determining whether the second hashed password includes the predefined sequence of bits; and
  when the second hashed password includes the predefined sequence of bits, designating the third password as the auditable password.

3. The method of claim 1, further comprising:
f) when steps a-d have been repeated such that each character in the set of characters has been appended to the end of the first password and the bit string from step c does not include the predefined sequence of bits:
  1) appending two or more characters to the end of the first password to form the modified first password;
  2) applying the hash function to the modified first password from step 1;
  3) evaluating a bit string that is the result of applying the hash function from step 2; and
  4) repeating steps 1-3 until the bit string from step 3 includes the predefined sequence of bits; and
g) when the bit string from step 3 includes the predefined sequence of bits, designating the modified first password from step 1 as the auditable password.

4. The method of claim 1, further comprising automatically detecting the auditable password in a document, file, network packet or computer memory.

5. The method of claim 1, further comprising pre-generating one or more auditable passwords.

6. The method of claim 5, wherein the one or more auditable passwords are obtained from a web service that provides one or more pre-generated passwords.

7. The method of claim 1, wherein the first character is appended to an end of the first password.

8. The method of claim 1, further comprising prepending or appending a key to the first password before appending the first character to the first password, the key comprising a string of characters.

9. The method of claim 1, wherein the predefined sequence of bits includes hexadecimal bytes corresponding to a current month and year.

10. The method of claim 1, wherein the first password includes one or more lower case alphabetic characters, one or more upper case alphabetic characters, one or more numeric characters and at least one non-alphanumeric printable character.

11. The method of claim 1, wherein the first password is generated by a computer program.

12. The method of claim 1, wherein the first password is supplied by a user.

13. An electronic computing device comprising:
a processing unit; and
system memory, the system memory including instructions that, when executed by the processing unit, cause the electronic computing device to:
  obtain a first password;
  append one or more characters from a set of characters to an end of the first password to form a modified first password;
  apply a hash function to the modified first password to form a first hashed password;
  determine whether the first hashed password includes a predefined sequence of bits;
  when the first hashed password includes the predefined sequence of bits, designating the first hashed password as an auditable password; and
  when the first hashed password does not include the predefined sequence of bits then perform steps to:
    a) append one or more different characters from the set of characters to the end of the first password to form a modified first password, the one or more different characters not previously appended to the end of the first password;
    b) apply the hash function to the modified first password;
    c) evaluate a bit string result of applying the hash function from step b;
    d) when the bit string result from step c does not include the predefined sequence of bits, repeat steps a-c until the bit string result from step c includes the predefined sequence of bits or until each character in the set of characters has been appended to the end of the first password per step a; and
    e) when the bit string from step c includes the predefined sequence of bits, designate the modified first password from step a as the auditable password.

14. The electronic computing device of claim 13, wherein the instructions further cause the electronic computing device to:
f) when steps a-d have been repeated such that each character in the set of characters has been appended to the end of the first password and the bit string from step c does not include the predefined sequence of bits:
  1) append two or more characters to the end of the first password to form the modified first password;
  2) apply the hash function to the modified first password from step 1;
  3) evaluate a bit string that is the result of applying the hash function from step 2; and 4) repeat steps 1-3 until the bit string from step 3 includes the predefined sequence of bits; and g) when the bit string from step 3 includes the predefined sequence of bits, designating the modified first password from step 1 as the auditable password.

15. The electronic computing device of claim 13, wherein the predefined sequence of bits includes hexadecimal characters corresponding to a current month and year.

16. The electronic computing device of claim 13, further comprising automatically detecting the auditable password in a document, file, network packet or computer memory.

17. The electronic computing device of claim 13, further comprising pre-generating one or more auditable passwords.

18. The electronic computing device of claim 17, wherein the one or more auditable passwords are obtained from a web service that provides one or more pre-generated passwords.

19. A computer readable storage device comprising instructions that, when executed, operate to:

obtain a first password, the first password comprising a string of one or more characters;

append a first character from a set of characters to the first password to form a modified first password;

apply a hash function to the modified first password to generate a first hashed password, the first hashed password comprising a first bit string;

determine whether a portion of the first hashed password includes a predefined sequence of bits;

when the first hashed password includes the predefined sequence of bits, designate the modified first password as an auditable password; and when the first hashed password does not include the predefined sequence of bits then, when executed, the instructions operate further to perform steps to:

a) append a different character from the set of characters to the end of the first password to form the modified first password, the different character not previously appended to the end of the first password;

b) apply the hash function to the modified first password;

c) evaluate a bit string result of applying the hash function from step b;

d) when the bit string result from step c does not include the predefined sequence of bits, repeat steps a-c until the bit string result from step c includes the predefined sequence of bits or until each character in the set of characters has been appended to the end of the first password per step a; and e) when the bit string from step c includes the predefined sequence of bits, designate the modified first password as the auditable password.

20. The computer readable storage device of claim 19 comprising instructions that, when executed operate further to add auditable passwords to a store of auditable passwords accessible via a web service.

* * * * *